United States Patent
Sasaki et al.

(10) Patent No.: US 7,878,532 B2
(45) Date of Patent: Feb. 1, 2011

(54) KNEE-PROTECTING AIRBAG APPARATUS

(75) Inventors: Takashi Sasaki, Aichi-ken (JP);
Kazuaki Bito, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 12/461,696

(22) Filed: Aug. 20, 2009

(65) Prior Publication Data
US 2010/0052296 A1 Mar. 4, 2010

(30) Foreign Application Priority Data
Aug. 26, 2008 (JP) .............................. 2008-216992

(51) Int. Cl.
*B60R 21/205* (2006.01)
*B60R 21/217* (2006.01)

(52) U.S. Cl. ................ 280/730.1; 280/732; 280/728.2; 280/736

(58) Field of Classification Search ............. 280/730.1, 280/728.3, 732, 728.2, 736
See application file for complete search history.

(56) References Cited

U.S. PATENT DOCUMENTS

| | | | |
|---|---|---|---|
| 6,302,437 B1 * | 10/2001 | Marriott et al. | ............. 280/732 |
| 6,705,638 B2 | 3/2004 | Abe et al. | |
| 6,817,627 B2 * | 11/2004 | Galmiche et al. | ........ 280/730.1 |
| 2002/0180188 A1 * | 12/2002 | Abe et al. | ................ 280/730.1 |
| 2005/0116449 A1 * | 6/2005 | Enders | .................... 280/730.1 |
| 2007/0200322 A1 * | 8/2007 | Sakakida | ................. 280/730.1 |

FOREIGN PATENT DOCUMENTS

| | | |
|---|---|---|
| JP | A-2002-347565 | 12/2002 |
| JP | A-2002-356137 | 12/2002 |
| JP | A-2003-104163 | 4/2003 |
| JP | A-2007-161090 | 6/2007 |

\* cited by examiner

*Primary Examiner*—Ruth Ilan
(74) *Attorney, Agent, or Firm*—Posz Law Group, PLC

(57) ABSTRACT

A knee-protecting airbag apparatus is mountable on a door of a glove box that has a box body provided with an opening at the rear and the door. The airbag apparatus includes an airbag, a generally columnar inflator housed in the airbag, a case housing the airbag and inflator, and an airbag cover constituting a rear face of the glove box door and being openable at airbag deployment. The inflator includes a body that discharges inflation gas and a fixing section that secures the body and the airbag to the case. The fixing section includes a projecting portion and the projecting portion extends at an upward or downward angle to the thickness direction of the glove box door.

7 Claims, 8 Drawing Sheets

KNEE-PROTECTING AIRBAG APPARATUS

The present application claims priority from Japanese Patent Application No. 2008-216992 of Sasaki et al., filed on Aug. 26, 2008, the disclosure of which is hereby incorporated into the present application by reference.

BACKGROUND OF THE INVENTION

1. Field of the Invention

The present invention relates to a knee-protecting airbag apparatus mountable on a glove box door that covers an opening on the rear side of a glove box in front of an occupant seated in the seat.

2. Description of the Related Art

A knee-protecting airbag apparatus mounted on a glove box is disclosed in JP2007-161090A. The glove box shown in the reference is a "bin-type" glove box that has an opening on top and is rotatable about the bottom region. The opening appears on a vehicle compartment when the glove box is drawn toward the rear about the bottom region. The airbag apparatus includes an airbag mounted on a rear wall of the glove box and deployable toward the rear, a generally columnar inflator housed inside the airbag for feeding the airbag with inflation gas, a housing of the airbag and inflator that is secured to the rear wall of the glove box and provided on the rear side with an emergence opening, and an airbag cover that covers the emergence opening of the housing and is openeable when pushed by the airbag under inflation.

Another airbag apparatus is disclosed in JP2003-104063A although the airbag of this apparatus is not designed to protect occupant's knees in itself. The airbag apparatus of this reference is mounted on a so-called "box-type" or "door-type" glove box that includes a box body provided on the rear side with an opening and a door that opens and closes the opening. The airbag apparatus is built into the door of the glove box, including an airbag and an inflator. When actuated, the airbag inflates with inflation gas fed by the inflator and moves the rear wall of the glove box door rearward (i.e. toward an occupant), and then the rear wall supported by the inflated airbag bolsters knees of the occupant.

When the airbag apparatus is mounted on the rear wall of a "bin-type" glove box in such a manner as to thicken the rear wall as in the former reference, the capacity of the glove box is recognized easily by sight when the box is opened, such that a user knows how much stuff he/she can store in the glove box. Therefore no problem arises in opening and closing of the box.

However, in a "box-type" or "door-type" glove box which has a box body and a door opening and closing the opening of the box body, it is difficult to know how much capacity the box has only by opening the door. What happens occasionally with this type of glove box is to store things in the box and when trying to shut the door, know that the door abuts against the stored things and cannot be shut. Especially when an airbag apparatus is mounted on such a glove box door, the door will be thickened and it will be more difficult to predict how much capacity the glove box has. When founding that the glove box door cannot be shut, the user will have to rearrange the stored objects or give up storing part of the objects. This will be very inconvenient.

On the other hand, a knee-protecting airbag apparatus of this kind is required to include an airbag, an inflator, and a housing of the airbag and inflator that is secured to a glove box door and provided with an emergence opening of the airbag on the rear side, and an airbag cover that covers the emergence opening in an openable manner.

Since the airbag is inflatable into a plate-shape elongated in a left and right direction for protecting both knees of an occupant, the inflator is desirably generally cylindrical both for feeding inflation gas to such an airbag and for compact storage.

However, such an inflator usually includes a generally cylindrical main body provided with gas discharge ports and a fixing section used to secure the main body and airbag to the housing. As disclosed in the latter reference, such fixing section includes a projecting portion such as bolts, and the projecting portion projects from the main body perpendicularly to the axial direction of the main body for nut engagement with the housing. That is, the fixing section of the inflator thickens the thickness of the door of the glove box on which the airbag apparatus is mounted, and therefore, it is desired to reduce the thickness of the glove box door even when an airbag apparatus is mounted thereon.

SUMMARY OF THE INVENTION

The object of the present invention is to provide a knee-protecting airbag apparatus that is mountable on a door of a glove box without increasing the thickness of the door.

The knee-protecting airbag apparatus of the invention is adapted to be mounted on a door of a glove box that has a box body provided with an opening at the rear and the door. The airbag apparatus includes an airbag folded-up for deployment rearward from the glove box door, a case that houses the airbag and adapted to be secured to an interior of the glove box door, the case including at the rear with an opening for emergence of the airbag, an inflator housed inside the airbag and feeding the airbag with inflation gas, and an airbag cover constituting a rear face of the glove box door and covering the airbag emergence opening of the case in an openable manner at airbag deployment. The inflator includes a generally columnar body extending in a left and right direction and provided with gas discharge ports and a fixing section that secures the body and the airbag to the case. The fixing section includes a projecting portion that projects from the body to an outside of the airbag and is secured to the case. The projecting portion as secured to the case extends at an upward or downward angle to the thickness direction of the door of the glove box.

In the airbag apparatus of the present invention, the projecting portion of the fixing section of the inflator does not protrude forward along the thickness direction of the glove box door as secured to the glove box door, but extends at an upward or downward angle to the thickness direction. With this configuration, the length in an anteroposterior direction (in the thickness direction of the glove box door) of the projecting portion equals to the cosine of the angle at which the projecting portion extends to the thickness direction of the glove box door, i.e., is shortened relative to its actual length, thus reducing the thickness of the glove box door.

Therefore, the knee-protecting airbag apparatus of the present invention is mountable on a door of the glove box without increasing the thickness of the door, and thus increasing the capacity of the box body and improving usability of the glove box.

In the above airbag apparatus, the fixing section of the inflator is desirably located at the rear relative to the front face of the case in the thickness direction of the glove box door. This configuration further conduces to the reduction of the thickness of the airbag apparatus in an anteroposterior direction, and further to the reduction of the thickness of the glove box door.

Moreover, it is desired that the inflator of the airbag apparatus is located proximate the center in a vertical direction of the case and the airbag is folded up and housed in the case at the rear of the inflator such that an upper portion of the airbag is located above the inflator whereas a lower portion is located below the inflator.

With this configuration, the airbag is housed above and below the inflator, and therefore the airbag has a thin folded-up configuration. Further, upon deployment, inflation gas flows into the upper portion and lower portion of the airbag smoothly and unfurls and inflates the airbag widely in a vertical direction. As a result, the airbag will be suitable for protecting knees of occupants of various physical sizes.

If the projecting portion of the fixing section of the inflator is comprised of a bolt, it is desired that the bolt is nut-fastened to the case proximate the front end of and proximate the center in a vertical direction of the case and extends at an angle surpassing 0° and not over 90° to a forward-oriented direction in the thickness direction of the door of the glove box. This configuration helps reduce the dimension of the airbag apparatus both in height and thickness. If the leading end of the bolt is located at the rear relative to the front face of the case, the thickness of the airbag apparatus will be further reduced.

With the above configuration, furthermore, the mounting area of the case on which mounting holes for receiving the bolts are formed are located diagonally, and thus providing a space for nut-fastening and facilitating nut-fastening of the bolt.

If the inflator includes a plurality of such bolts and the bolts are arranged along a left and right direction, it is desired that the case includes on the front wall that is opposed to the emergence opening a first angle portion that protrudes toward the rear in a V-shape and extends in a left and right direction such that either the upper side or lower side of the angle portion acts as the mounting area to which the inflator and the airbag are secured by the bolts and nuts and that the rear side of the mounting area acts as a space for housing the inflator. With this configuration, the first angle portion acts like a rib and reinforces the case.

If the front wall of the case includes on the opposite side of the first angle portion relative to the inflator a second angle portion that protrudes to the rear in a U-shape, the case will be further reinforced by both angle portions.

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Figure 1:
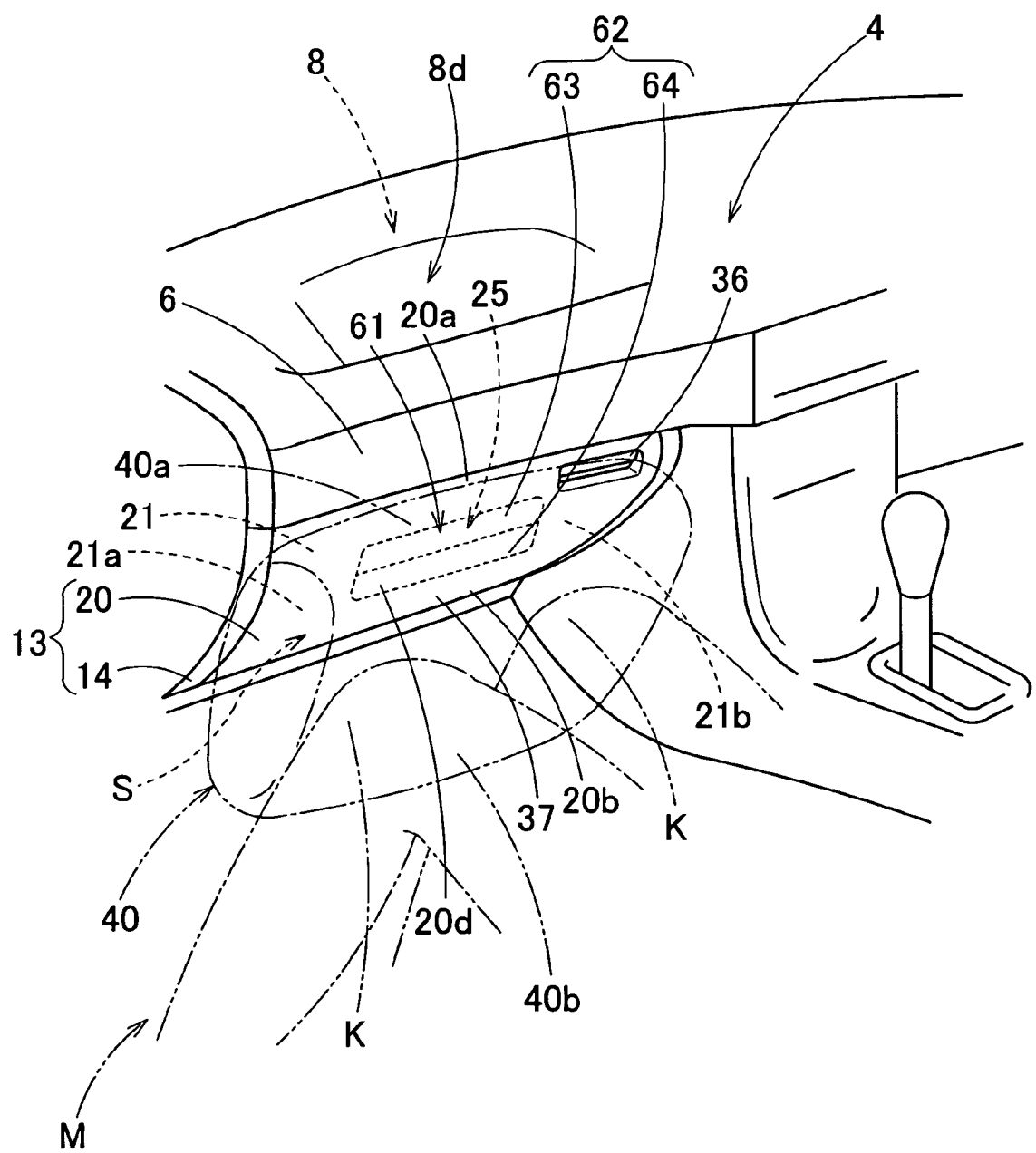
FIG. 1 is a perspective view of a glove box door having a knee-protecting airbag apparatus embodying the invention built in, as mounted on a vehicle.
Figure 2:
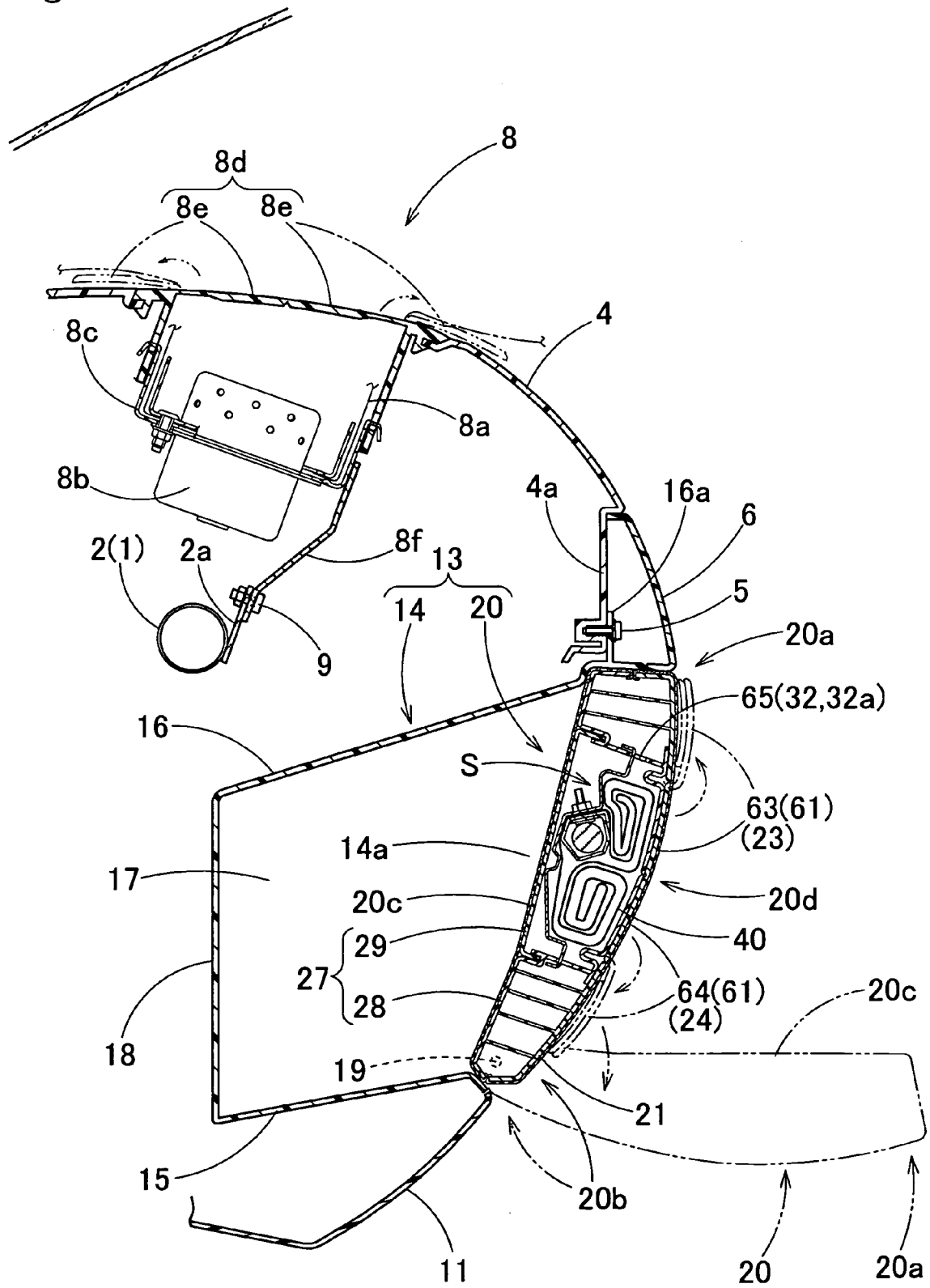
FIG. 2 is a schematic vertical section of an area of an instrument panel of the vehicle where the airbag apparatus is mounted, taken along an anteroposterior direction.

A knee-protecting airbag apparatus S embodying the present invention is depicted in FIGS. 1 and 2, mounted inside a door 20 of a glove box 13 placed on the lower region of an instrument panel (or dash board) 4 in front of a front passenger's seat.

Figure 3:
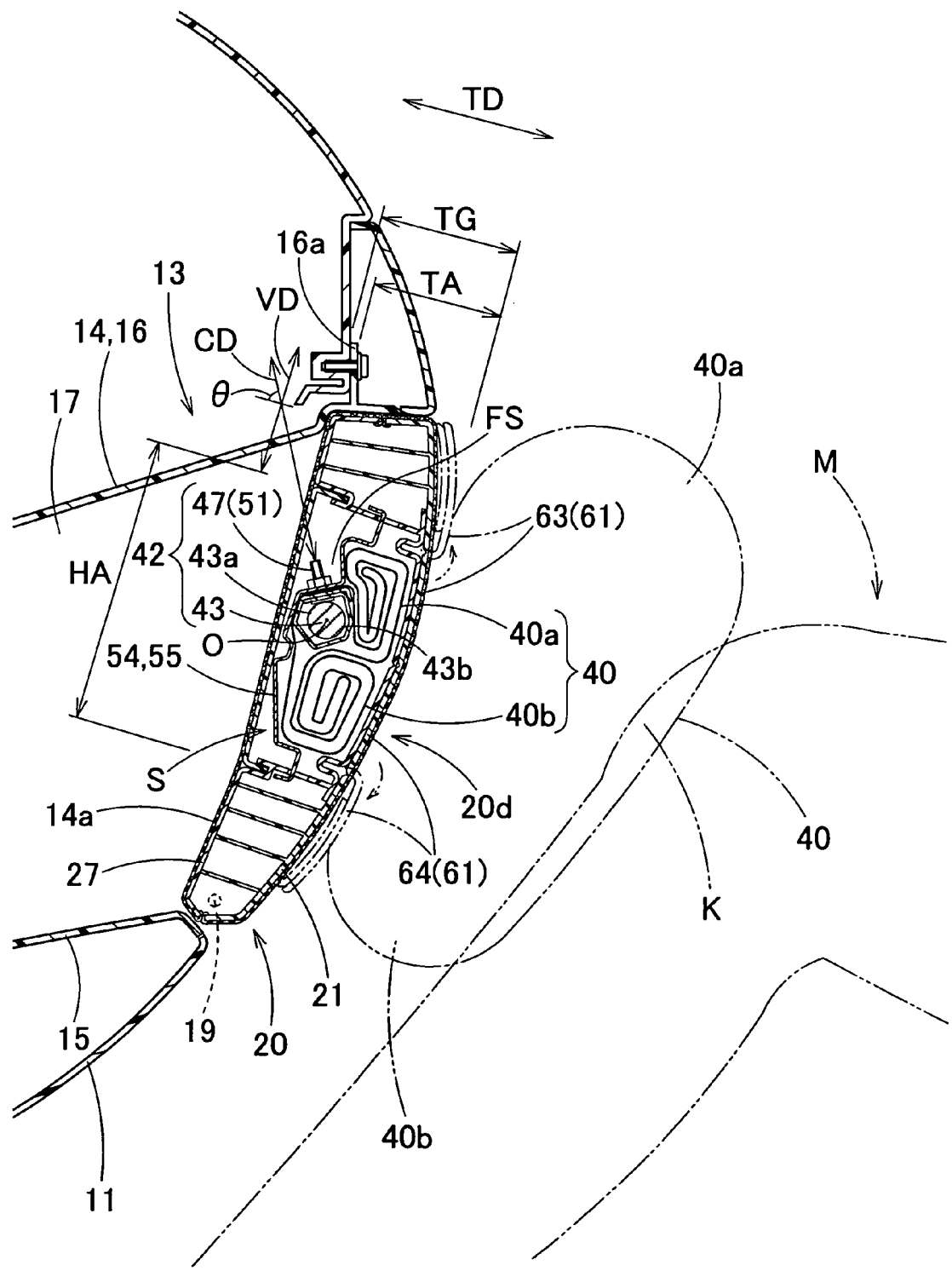
FIG. 3 is a schematic vertical section of the glove box door of FIG. 1.

Unless otherwise specified, left/right, front/rear and up/down directions in this specification are based on a condition of the glove box door 20 closing the opening 14a of the glove box 13 with the upper end 20a located rearward relative to the lower end 20b, as referred to FIG. 2. Specifically, left/right direction is intended to refer to that of a vehicle steering straight ahead, and front/rear direction is intended to refer to that of the vehicle which extends along the thickness direction TD of the glove box door 20 (FIG. 3). Up/down direction is intended to refer to that of the vehicle which extends perpendicularly to the thickness direction TD of the glove box door 20.

Referring to FIG. 2, the glove box 13 is of so-called "box-type" or "door-type" including a box body 14 fabricated of rigid synthetic resin such as polypropylene and a door 20 that covers an opening 14a of the box body 14 in an openable fashion. The opening 14a is located on the rear side of the box body 14. The box body 14 has a generally rectangular parallelepiped box shape including a lower wall 15, an upper wall 16 facing the lower wall 15 above the lower wall 15, left and right side walls 17 connecting left and right ends of the lower wall 15 and upper wall 16 and opposing each other in a left and right direction, a front wall 18 and a rectangular opening 14a at the rear. The front wall 18 is coupled to front ends of the lower wall 15, upper wall 16 and side walls 17 and arranged generally vertically in such a manner as to face towards the opening 14a. Each of the left and right side walls 17 is respectively provided proximate the bottom of the rear end region with a hinge pin 19 about which the glove box door 20 rotates when opening. The side walls 17 further include unillustrated brackets for attachment to the vehicle body structure 1 and unillustrated recesses for engagement with latches formed on the glove box door 20 proximate the top of the rear end region.

The upper wall 16 includes a joint lug 16a to be bolt 5 fixed to a joint tongue 4a of the dashboard 4 as shown in FIG. 2. This joint is covered by a decoration panel 6.

An undercover 11 is arranged below the glove box 13.

When moved to shut the opening 14a of the box body 14, latches of the glove box door 20 described above are inserted into the recesses of the side walls 17 due to such biasing means as a spring, so that the door 20 keeps closing the opening 14a and is arranged generally vertically. If the latches are disengaged from the recesses of the side walls 17 by pulling a lever 36 (FIG. 1), the glove box door 20 rotates rearward about the lower end 20b pivoting about the hinge pins 19 as indicated by double-dashed lines in FIG. 2, so that the opening 14a appears. When the door 20 opens, an unillustrated projection formed in the vicinity of the lower end 20b abuts against a stopper formed on the box body 14, thereby arranging the front plane 20c (FIG. 2) of the door 20 generally horizontally. Although not shown, a damping mechanism is mounted around the hinge pins 19 for suppressing abrupt opening of the door 20.

The hinge pins 19, lever 36, unillustrated latches, projection, stopper and damping mechanism are known components of a glove box of this kind.

Referring to FIG. 2, the door 20 of the glove box 13 includes an outer panel 21 which forms a rear face 20*d* of the door 20 as closed and an inner panel 27 forming a front face 20*c*. The airbag apparatus S is located between the outer panel 21 and inner panel 27. The outer panel 21 and inner panel 27 are butt-joined by outer peripheral edges and arranged generally vertically so as to face each other in an anteroposterior direction. The outer panel 21 and inner panel 27 are respectively covered on the outer surface with skins 37 and 38 (FIG. 4), of woven fabric, nonwoven fabric or the like, for masking sink marks and parting lines and thus for improving appearance.

Figure 4:
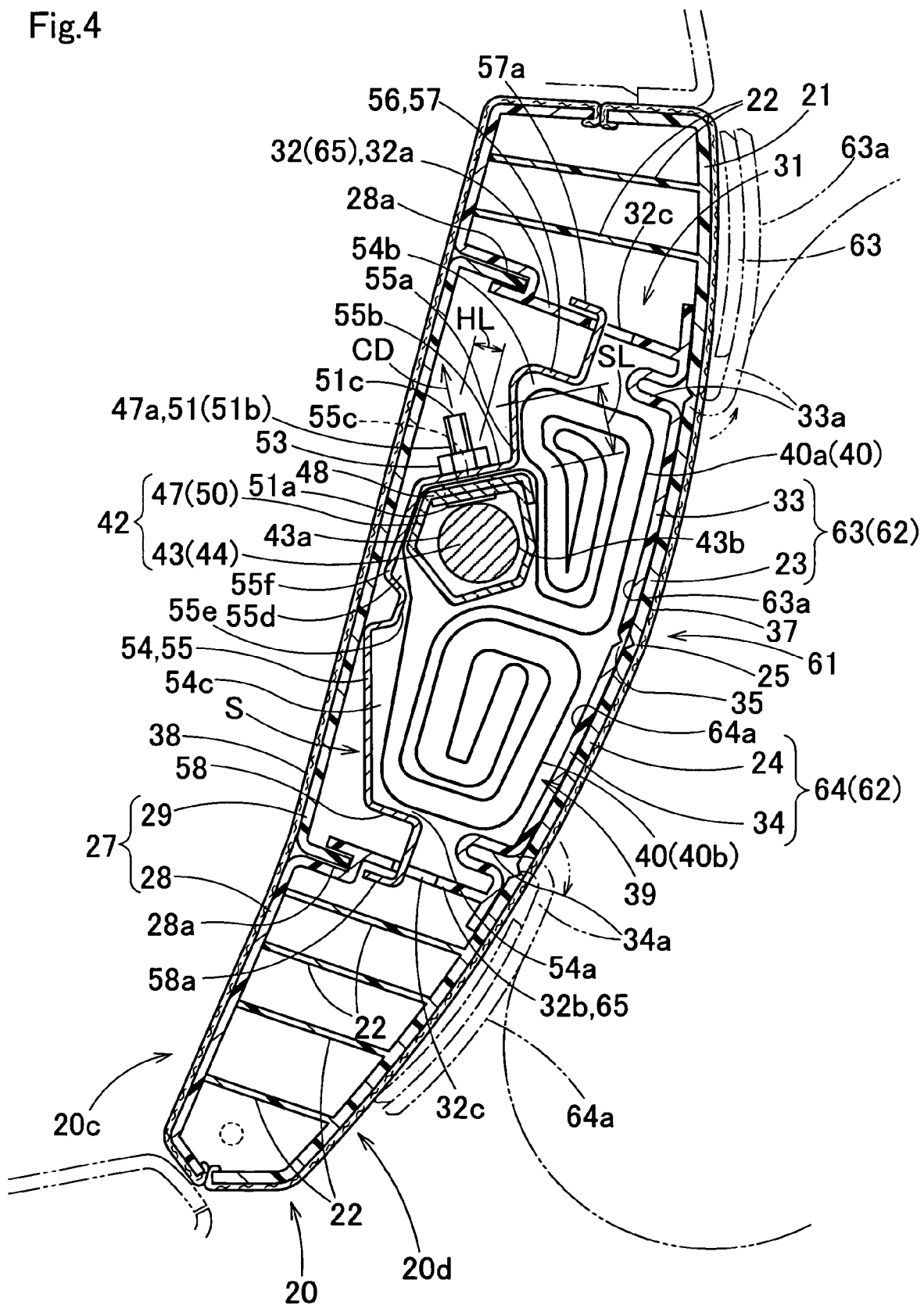
FIG. 4 is a schematic enlarged vertical section of the glove box door of FIG. 1.

As shown in FIG. 4, the outer panel 21 is located on an inboard side of the rear face 20*d* of the glove box door 20. The outer panel 21 is fabricated of rigid synthetic resin such as filler-reinforced polypropylene and is provided above and below the airbag apparatus S with numerous reinforcing ribs 22 of a plate- or stick-shape, extending toward the inner panel 27 and fixed to the inner panel 27. The outer panel 21 includes at the rear of the airbag apparatus S an upper door 23 and a lower door 24 each having a rectangular plate shape. The doors 23 and 24 are provided therearound with a tearable portion 25 which is tearable when pushed by the airbag 40 under inflation. The tearable portion 25 is comprised of a continuous groove or a series of intermittent grooves formed on the front face of the outer panel 21, and forms a "8" shape as viewed from the rear (FIG. 1). The upper door 23 is adhered to a later-described upper door 33 of the housing portion 31 by the front face whereas the lower door 24 is adhered to a lower door 34 of the housing portion 31 by the front face below the upper door 23. Upon airbag deployment, the doors 23 and 24 are separated from the surrounding due to tear of the tearable portion 25 and respectively open upward and downward together with the doors 33 and 34 of the housing portion 31 as indicated by double-dashed lines in FIG. 4.

The inner panel 27 forms the front face of the glove box door 20 and includes a cover panel 29 located in front of the airbag apparatus S and a front wall portion 28 located around the cover panel 29. The cover panel 29 is fabricated of rigid synthetic resin such as filler-reinforced polypropylene whereas the front wall portion 28 is of thermo-plastic elastomer of olefin or the like. In this specific embodiment, the outer panel 21 and inner panel 27 are coupled together by vibration welding at areas of the reinforcing ribs 22, upper door 23 and lower door 24. The cover panel 29 is fastened into connection recesses 28*a* of the front wall portion 28 by suitable adhesive or fastening structure after the airbag apparatus S is mounted on the glove box door 20, and thus coupled to the front wall portion 28. The cover panel 29 and front wall portion 28 are so coupled together as to make the front face 20*c* of the glove box door 20 flush.

The front wall portion 28 includes a housing portion 31 that encloses the upper, lower, left, right and rear sides of the airbag apparatus S. The housing portion 31 includes a cylindrical circumferential wall 32 covering the upper, lower, left and right sides of the airbag apparatus S. The upper wall 32*a* and lower wall 32*b* of the circumferential wall 32 are provided with a plurality of through holes 32*c* arranged along a left and right direction for engagement with later-described hooks 57*a* and 58*a* of the case 54 of the airbag apparatus S.

The housing portion 31 is provided on an area at the rear on the airbag apparatus S with an upper door 33 and a lower door 34 each having a rectangular plate shape as well as the doors 23 and 24 of the outer panel 21. The upper door 33 is provided on the top with a U-curved portion 33*a* which serves as a hinge 33*a* when opening upward. The lower door 34 is located below the upper door 33 and is provided at the bottom with a U-curved portion 34*a* which serves as a hinge 34*a* when opening downward. Between the lower end of the upper door 33 and the upper end of the lower door 34 is a thinned tearable portion 35 which is tearable when pushed by the airbag under inflation. The tearable portion 35 is formed into a horizontal straight line. Laterals of the upper door 33 and lower door 34 are separated from the circumferential wall 32 of the housing portion 31. The upper door 33 and lower door 34 may be separated in advance instead of providing the tearable portion 35.

Figure 5:
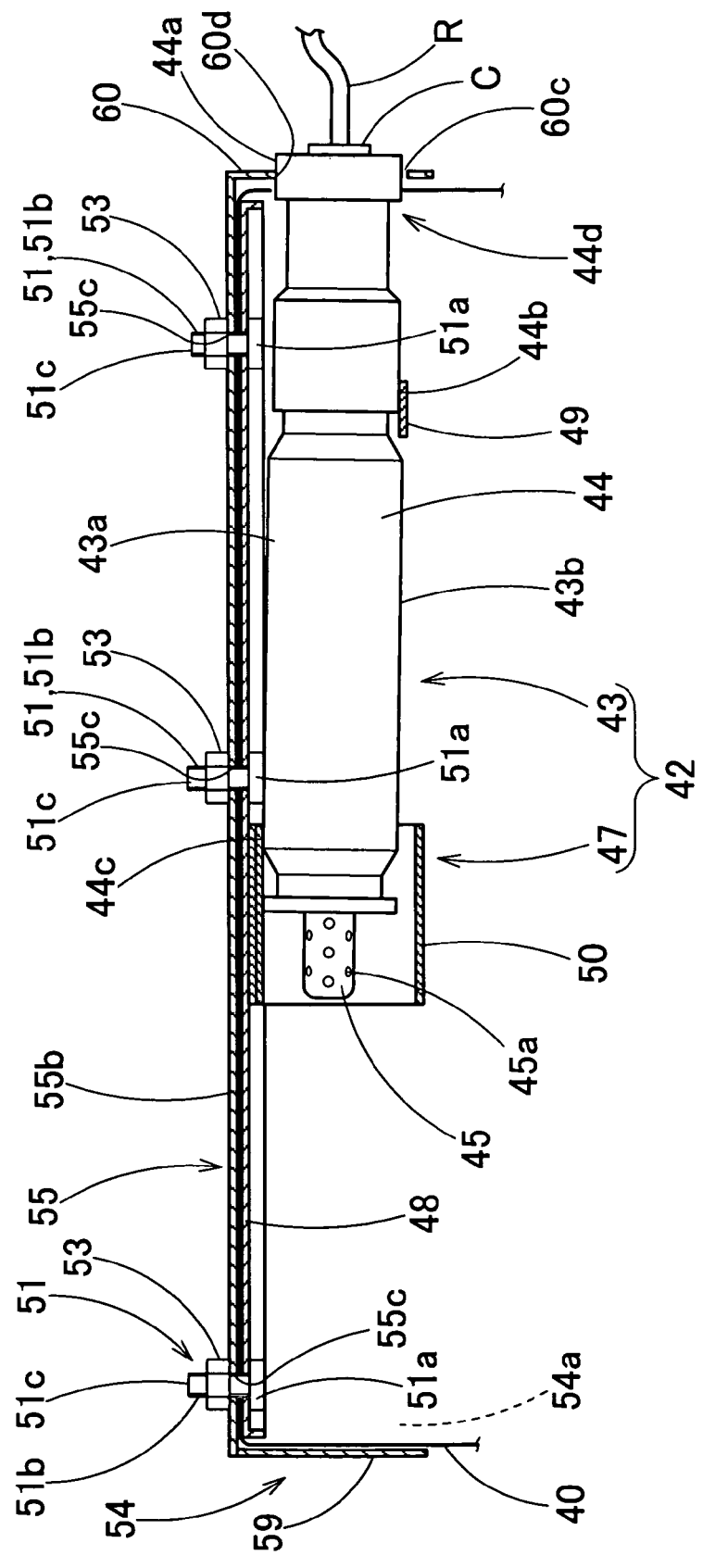
FIG. 5 is a schematic horizontal section showing the way a fixing section of an inflator and a case are fastened together.
Figure 6:
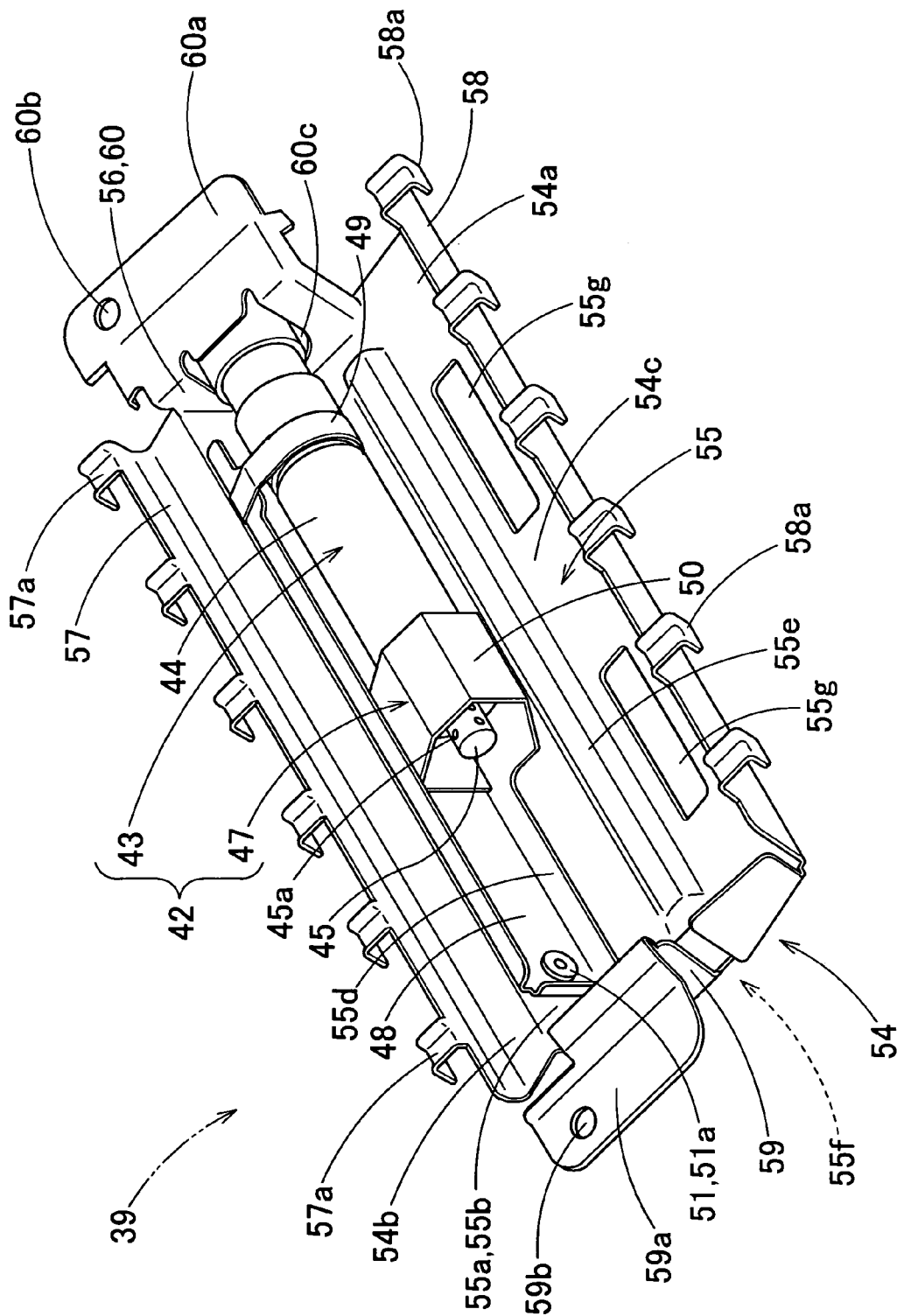
FIG. 6 is a schematic perspective view showing the inflator and case of FIG. 5 assembled together.

Referring to FIGS. 4 to 6, the knee-protecting airbag apparatus S includes an airbag 40, an inflator 42, a case 54 and an airbag cover 61. The airbag cover 61 includes a door area 62 located on the rear face 20*d* of the glove box door 20 and a circumferential wall 65 located around a later-described circumferential wall 56 of the case 54. The door area 62 is comprised of the upper doors 23, 33, lower doors 24, 34 of the outer panel 21 and of the housing portion 31 of the inner panel 27, the breakable portions 25, 35 and vicinities of the hinge portions 33*a* and 34*a*. The door area 62 includes an upper door area 63 comprised of the upper doors 23, 33 of the outer panel 21 and housing portion 31 and a lower door area 64 comprised of the lower doors 24 and 34. The upper doors 23 and 33, and the lower doors 24 and 34 are integrally coupled by vibration welding as described above. When pushed by the airbag 40 under inflation, as indicated by double-dashed lines in FIG. 4, the upper door area 63 opens upward about the hinge portion 33*a* due to tear of the tearable portions 25 and 35 of the upper doors 23 and 33, whereas the lower door area 64 opens downward about the hinge portion 34*a* due to tear of the tearable portions 25 and 35 of the lower doors 24 and 34. The circumferential wall 65 of the airbag cover 61 is comprised of the circumferential wall 32 of the housing portion 31.

The airbag 40, upon inflation, pushes and opens the upper door area 63 and lower door area 64 of the airbag cover 61 and emerges from the rear face 20*d* of the glove box door 20, and deploys rearward. The airbag 40 is inflatable into a generally rectangular plate shape elongated in a left and right direction as viewed from the rear, with a certain thickness in an anteroposterior direction as indicated by double-dashed lines in FIGS. 1 and 3, thus deployed in front of both knees K of an occupant M.

Referring to FIG. 5, the inflator 42 is to feed the airbag 40 with inflation gas. The inflator 42 is generally columnar in shape and is so arranged inside the airbag 40 that its axis extends along a left and right direction. In this specific embodiment, the inflator 42 includes a generally columnar body 43 and a fixing section 47 that secures the body 43 to the case 54. The body 43 includes a generally columnar large-diameter portion 44 and a generally columnar small-diameter portion 45 located on the leading end of the large-diameter portion 44. The small-diameter portion 45 is provided with a plurality of gas discharge ports 45*a* that emits inflation gas when the inflator 42 is activated. The large-diameter portion 44 is provided on the end facing away from the small-diameter portion 45 with an unillustrated terminal to which a connector C of a lead wire R extending from a predetermined circuit is connected.

Referring to FIGS. 5 and 6, the fixing section 47 includes a base 48 that is elongated in a left and right direction and has a length slightly less than twice as long as the main body 43, an annular belt portion 49 and a generally hexagonal cylindrical portion 50. The base 48 includes a plurality of bolts 51. The bolts 51 acts as a projecting portion 47a of the inflator 42 that extends and projects from the inflator body 43 and is secured to the case 54. In this embodiment, the bolts 51 are located on three positions; proximate left and right ends of and at the center in a left and right direction of the base 48. The cylindrical portion 50 is located proximate the center in a left and right direction of the base 48 in such a manner as to encircle the small-diameter portion 45 of the inflator body 43. The belt portion 49 is located proximate the right end of the base 48.

As shown in FIG. 5, if the bolt 51 located proximate the belt portion 49 is fastened into a nut 53 on a later-described mounting area 55b of the case 54 while having the outer circumference 44a of the front upper region of a root region of the large-diameter portion 44 away from the small-diameter portion 45 abutted on the inner circumference 60d of the insert hole 60c of the case 54, the inner circumference of the belt portion 49 pushes the outer circumference 44b of the rear lower portion of the large-diameter portion 44 upward and forward and the outer circumference 44c of the front upper portion of the leading end region of the large-diameter portion 44 abuts on and is supported by the base 48 and the head 51a of the bolt 51. Thus the fixing section 47 secures the inflator body 43 to the case 54 in a stable manner.

Referring to FIG. 3 where the airbag apparatus S is mounted on the glove box door 20, the extending direction of the bolt 51 from the head (root portion) 51a to the screw portion (leading end) 51b, i.e. the projecting direction CD of the bolt 51 projecting from the inflator body 43, is oriented upward and forward from the axial center O of the inflator body 43 such that it draws towards a vertical direction VD, and more specifically, the projecting direction CD is oriented upward at an angle θ (about 60°, in the illustrated embodiment) to the forward-oriented direction of the thickness direction TD of the glove box door 20 that passes through the axial center O of the inflator body 43.

In other words, when describing on a basis of the circumferential direction of the inflator body 43, the bolts 51 of the fixing section 47 are located on the front face 43a of the inflator body 43, not on the rear face 43a, and each of them extends forward and upward at the angle θ surpassing 0° and not over 90° (about 60°, in the illustrated embodiment) to the forward-oriented direction of the thickness direction TD of the glove box door 20 when secured to the case 54.

The axial direction of each of the mounting holes 55c of the mounting area 55b of the case 54, i.e., the projecting direction CD of the screw portion 51b of each of the bolts 51, and the length SL of the screw portion 51b are so predetermined that the leading end 51c of the screw portion 51b may not be located forward relative to the front face 55f (FIG. 4) of the case 54.

The case 54 is made of sheet metal and is located inside the glove box door 20 to serve as a housing of the airbag 40 and inflator 42 as best shown in FIG. 4. The case 54 includes a generally square tubular circumferential wall 56, a front wall 55 closing off the front side of the circumferential wall 56 and an opening 54a, at the rear side, which allows emergence of the airbag 40, and thus having a generally rectangular parallelepiped box shape. As shown in FIGS. 5 and 6, the circumferential wall 56 includes an upper wall 57 extending rearward from the upper edge of the front wall 55, a lower wall 58 extending rearward from the lower edge of the front wall 55 so as to oppose the upper wall 57, and side walls 59 and 60 extending rearward in parallel to each other from lateral edges of the front wall 55.

Referring to FIGS. 4 and 6, the front wall 55 extends generally vertically when mounted on the globe box 13 or on a vehicle. The front wall 55 includes a first angle portion 55a that is located below and proximate the upper wall 57 and protrudes toward the rear in a V-shape. The first angle portion 55a extends in a left and right direction. The lower plane of the first angle portion 55a acts as a mounting area 55b to which the bolts 51 of the fixing section 47 of the inflator 42 are secured, and an area below the first angle portion 55a (or below the mounting area 55b) serves as a housing 55d of the inflator 42. The mounting area 55b includes mounting holes 55c arranged along a left and right direction for receiving the bolts 51 of the inflator 42. The space between the first angle portion 55a and the upper wall 57 serves as an upper housing area 54b for housing the upper portion 40a of the airbag 40.

The front wall 55 further includes below the inflator housing 55d a second angle portion 55e that is bent in a U-shape and protrudes toward the rear, which is less projecting relative to the first angle portion 55a. The space between the rear area of the second angle portion 55e and the lower wall 58 serves as a lower housing area 54c for housing the lower portion 40b of the airbag 40.

The first and second angle portions 55a and 55e enhance rigidity of or reinforce the front wall 55 as well as partitioning the housing area of the inflator 42 and airbag 40. As shown in FIG. 6, the front wall 55 is provided with weight-reducing slots 55g running through in an anteroposterior direction.

Each of the upper wall 57 and lower wall 58 of the circumferential wall 56 is provided with a plurality of hooks 57a/58a for engagement with the through holes 32c of the upper wall 32a and lower wall 32b of the circumferential wall 32 of the housing portion 31 in the inner panel 27. Each of the hooks 57a and 58a extends outwardly in a vertical direction from the rear ends of the upper wall 57 and lower wall 58 and then extends forward, thus having a J-shaped section as best shown in FIG. 4. The hooks 57a and 58a hold the upper wall 32a and lower wall 32b of the housing portion 31 securely to prevent the hinge portions 33a and 34a and their vicinities from moving towards the rear when the upper door 63 and lower door 64 of the airbag cover 41 are pushed by the airbag 40 and thus to allow the tearable portions 25 and 35 to tear smoothly upon airbag deployment.

As shown in FIG. 6, the side walls 59 and 60 of the circumferential wall 56 respectively includes a tongue 59a/60a extending outwardly for securing the case 54 to the outer panel 21. Each of the tongues 59a and 60a is provided with a mounting hole 59b/60b for receiving a bolt from the front side for fastening the tongue 59b/60b to the outer panel 21.

The side wall 60 on the right side further includes a though hole 60c for receiving the root-side end 44d of the inflator body 43 such that it projects from the case 54 for receiving the above-described connector C for activation of the airbag.

Mounting of the airbag apparatus S on the vehicle starts with storing the fixing section 47 of the inflator 42 inside the airbag 40 such that the bolts 51 project out of the airbag 40. Then the airbag 40 is folded up. Specifically, in the flattened state, the upper region 40a and lower region 40b of the airbag 40 are respectively folded (rolled, in the illustrated embodiment) towards the vertical center on the front side and then lateral edges of the vertically folded-up airbag 40 are folded towards the lateral center, thus completing the folding of the airbag 40. At this time, a wrapping member is wound around the airbag 40 for keeping the folded-up configuration. The folding of the airbag in a left and right direction may be performed before the rolling of the upper and lower regions 40a and 40b.

The airbag 40 is then set in the case 54 such that the bolts 51 project out of the mounting holes 55c of the mounting area 55b. Subsequently, the inflator body 43 is set in from the insert hole 60c of the case 54 such that it is inserted into the belt portion 49 and cylindrical portion 50 of the fixing section 47 housed inside the airbag 40, and then the bolts 51 are fastened into nuts 53. At this time, referring to FIG. 5, if the bolt 51 located proximate the belt portion 49 is nut-fastened to the mounting area 55b of the case 54, the outer circumference 44a of the front upper region of the root region of the large-diameter portion 44 abuts on the inner circumference 60d of the insert hole 60c of the case 54, whereas the inner circumference of the belt portion 49 pushes the outer circumference 44b of the rear lower portion of the large-diameter portion 44 upward and forward and the outer circumference 44c of the front upper portion of the leading end region of the large-diameter portion 44 abuts on and is supported by the base 48 and the head 51a of the bolt 51 as described above. Thus the inflator body 43 is secured to the case 54 in a stable manner, and an airbag module 39 is provided. The airbag module 39 is comprised of the knee-protecting airbag apparatus S except the airbag cover 61.

In the interim, the glove box door 20 is assembled by vibration welding of the outer panel 21 and inner panel 27 at the housing portion 31 and front wall portion 28. The cover panel 29 of the inner panel 21 is not yet mounted on the door 20.

Thereafter, the airbag module 39 is mounted on this glove box door 20, specifically inside the circumferential wall 32 of the housing portion 31 (or inside the circumferential wall 65 of the airbag cover 61), by engagement of the hooks 57a and 58a of the case 54 and the through holes 32c of the circumferential wall 65 of the airbag cover 61 (or the circumferential wall 32 of the housing portion 31) and bolt-fixing of the tongues 59a and 60a of the side walls 59 and 60 of the case 54 to the outer panel 21 utilizing the mounting holes 59b and 60b. Thus the knee-protecting airbag apparatus S is assembled with the glove box door 20.

Subsequently, the cover panel 29 is coupled with the front wall portion 28 of the inner panel 27 utilizing the connection recesses 28a, such that the cover panel 29 covers the front side of the airbag apparatus S. When the surface skins 38 and 39 are applied, the glove box door 20 is completed with the airbag apparatus S built-in. The surface skin 37 may alternatively be applied on the outer panel 21 before the welding of the outer panel 21 and inner panel 27, or after the welding and before the assembling of the cover panel 29 with the inner panel 27.

Thereafter, the glove box door 20 is assembled with the box body 14 to complete the glove box 13. The glove box 13 is then mounted on the vehicle whereas the lead wire R extending from the activating circuit is connected to the inflator body 43 via not-shown apertures formed on the box body 14 and inner panel 27. Thus the glove box 13 is mounted on the vehicle together with the knee-protecting airbag apparatus S.

If an actuating signal is fed to the inflator body 43 via the lead wire R, the inflator 42 discharges inflation gas from the gas discharge ports 45a. Then the airbag 40 inflates and pushes and opens the upper door 63 and lower door 64 of the airbag cover 61 upward and downward, so that the airbag 40 emerges from the emergence opening 54a of the case 54 and deploys in front of knees K of an occupant M as shown in FIG. 3. The deployed airbag 40 properly receives and protects the knees moving forward.

The deployed airbag 40 is supported at the front side by back sides 63a and 64a (FIG. 4) of the upper door 63 and lower door 64 as opened and by rear faces 21a and 21b of regions on the left and right of the airbag cover 61 (FIG. 1).

As shown in FIGS. 1 and 2, the vehicle in the illustrated embodiment is also provided above the glove box 13 with an airbag apparatus 8 for a front passenger's seat for protecting the upper body of the occupant M. The airbag apparatus 8 is mounted on an interior of the top face of the instrument panel 4 and includes an airbag 8a, an inflator 8b for feeding inflation gas to the airbag 8a, a case 8c housing the airbag 8a and inflator 8b, and an airbag cover 8d covering the top of the case 8c and provided with a door 8e for opening when pushed by the airbag 8a under inflation. The airbag cover 8d in the illustrated embodiment is integral with the instrument panel 4. The airbag apparatus 8 is bolt 9 fixed to a bracket 2a secured to an instrument panel reinforcement 2 which is part of the vehicle body structure 1 by a bracket 8f extending from the case 8c. The airbag apparatus 8 is actuated simultaneously with the knee-protecting airbag apparatus S and the airbag 8a pushes and opens the airbag cover 8d and deploys to protect the upper body of the occupant M seated in the front passenger's seat.

When the airbag apparatus S of the foregoing embodiment is secured to the door 20 of the glove box 13 mounted on a vehicle, each of the bolts 51 acting as the projecting portion 47a of the fixing section 47 of the inflator 42 that projects to the outside of the airbag 40 and is secured to the case 54 does not protrude forward along the anteroposterior direction (or the thickness direction TD of the glove box door 20), but extends at an upward angle to the forward-oriented direction of the thickness direction TD as shown in FIG. 3. In other words, the projecting direction CD of each of the bolts 51 from the head 51a to the leading end 51c is oriented towards the vertical direction VD relative to the forward-oriented direction. With this configuration, the length in an anteroposterior direction of the bolt 51 equals to the cosine of the angle $\theta$ at which the bolt 51 extends to the thickness direction TD towards the vertical direction VD, and therefore, is shortened relative to its actual length, thus conducing to reduction of the thickness TG of the glove box door 20. More specifically, referring to FIG. 4, the length HL in an anteroposterior direction of the screw portion 51b of the bolt 51 projecting from the base 48 equals to the cosine of the length SL of the screw portion 51b by the angle $\theta$, i.e., $HL=SL\times\cos\theta$ (since the angle $\theta$ is 60° in the illustrated embodiment, $HL=SL\times0.5$), thus being shorter than the length SL.

Therefore, the knee-protecting airbag apparatus S embodying the present invention is mountable on the door 20 of the glove box 13 without increasing the thickness TG of the door 20, and thus increasing the capacity of the box body 14 and improving usability of the glove box 13.

In the foregoing embodiment, the leading end 51c of each of the bolts 51, i.e., the front end of the fixing section 47 of the inflator 42, is located at the rear relative to the front face 55f of the case 54. This configuration further conduces to the reduction of the dimension TA (FIG. 3) of the airbag apparatus S in an anteroposterior direction, and further to the reduction of the thickness TG of the door 20.

Moreover, the inflator 42 of the foregoing embodiment is located proximate the center in a vertical direction of the case 54 and the airbag 40 is folded up and housed in the case 54 at the rear of the inflator 42 such that the upper portion 40a of the airbag 40 is located above the inflator 42 whereas the lower portion 40b is located below the inflator 42. That is, since the airbag 40 is housed at the rear of and above and below the inflator 42, the airbag 40 has a thin folded-up configuration. Further, upon deployment, inflation gas flows into the upper portion 40a and lower portion 40b of the airbag 40 smoothly and unfurls and inflates the airbag 40 widely in a vertical direction. As a result, the airbag 40 will be suitable for protecting knees K of occupants M of various physical sizes. If this advantage does not have to be considered, it will also be appreciated to provide the mounting area 55b to which the fixing section 47 of the inflator 42 is secured proximate the upper end of the case 54A, as shown in FIG. 7, such that the folded-up airbag 40 is housed only below the inflator 42, or to provide the mounting area proximate the lower end of the case such that the airbag 40 is housed only above the inflator 42.

In the illustrated embodiment, moreover, the projecting portion 47a of the fixing section 47 of the inflator 42 is comprised of the bolts 51 fastened to the case 54 by the nuts 53. As is fastened to the case 54, each of the bolts 51 is located proximate the front face 55f of and proximate the center in a vertical direction of the case 54 and extends at the angle θ to the front direction in the thickness direction of the glove box door 20 towards the direction perpendicular to the thickness direction (i.e., towards the vertical direction VD). This configuration helps reduce the dimension of the airbag apparatus S both in a vertical direction and thickness direction as indicated as the height HA and thickness TA in FIG. 3. With this configuration, furthermore, the mounting area 55b of the case 54 on which the mounting holes 55c for receiving the bolts 51 are formed are located diagonally, and thus a space FS is provided for fastening the nuts 53 in the vicinity of the mounting area 55b (in the illustrated embodiment, between the front face 55f of the mounting area 55b and the upper housing area 54b) as shown in FIG. 3. This will facilitate nut-fastening of the bolts 51.

In the foregoing embodiment, the projecting direction CD of each of the bolts 51 from the head 51a to the leading end 51c is oriented diagonally forward and upward relative to the thickness direction TD of the glove box door 20. However, it will also be appreciated to configure the case 54 including the mounting area 55b and airbag cover 61 in a vertically reverse manner such that the projecting direction CD of the bolts 51 is directed diagonally forward and downward relative to the thickness direction of the glove box door 20.

Figure 7:
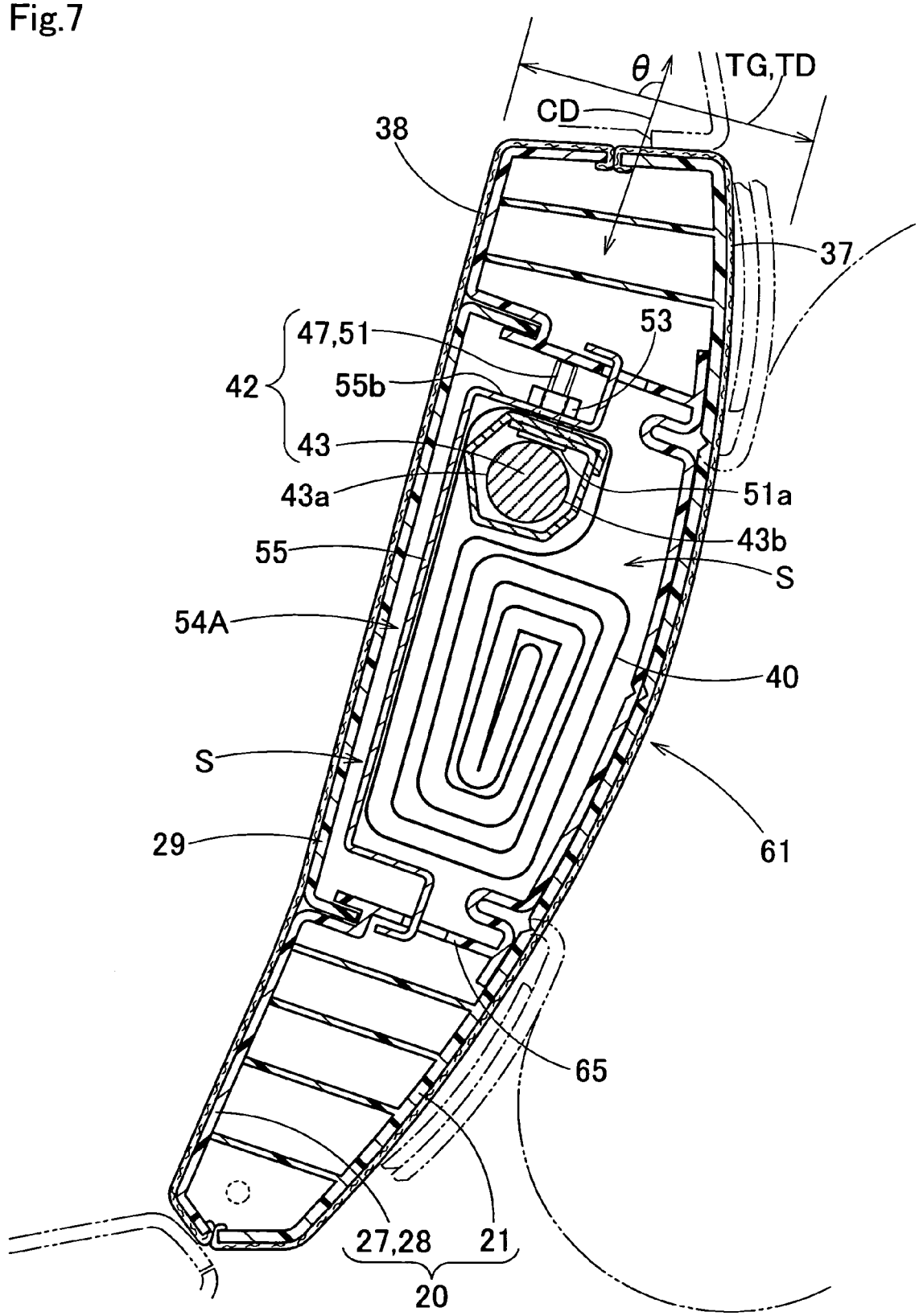
FIG. 7 is a schematic vertical section of a glove box door including another embodiment of the knee-protecting airbag apparatus, as mounted on a vehicle.
Figure 8:
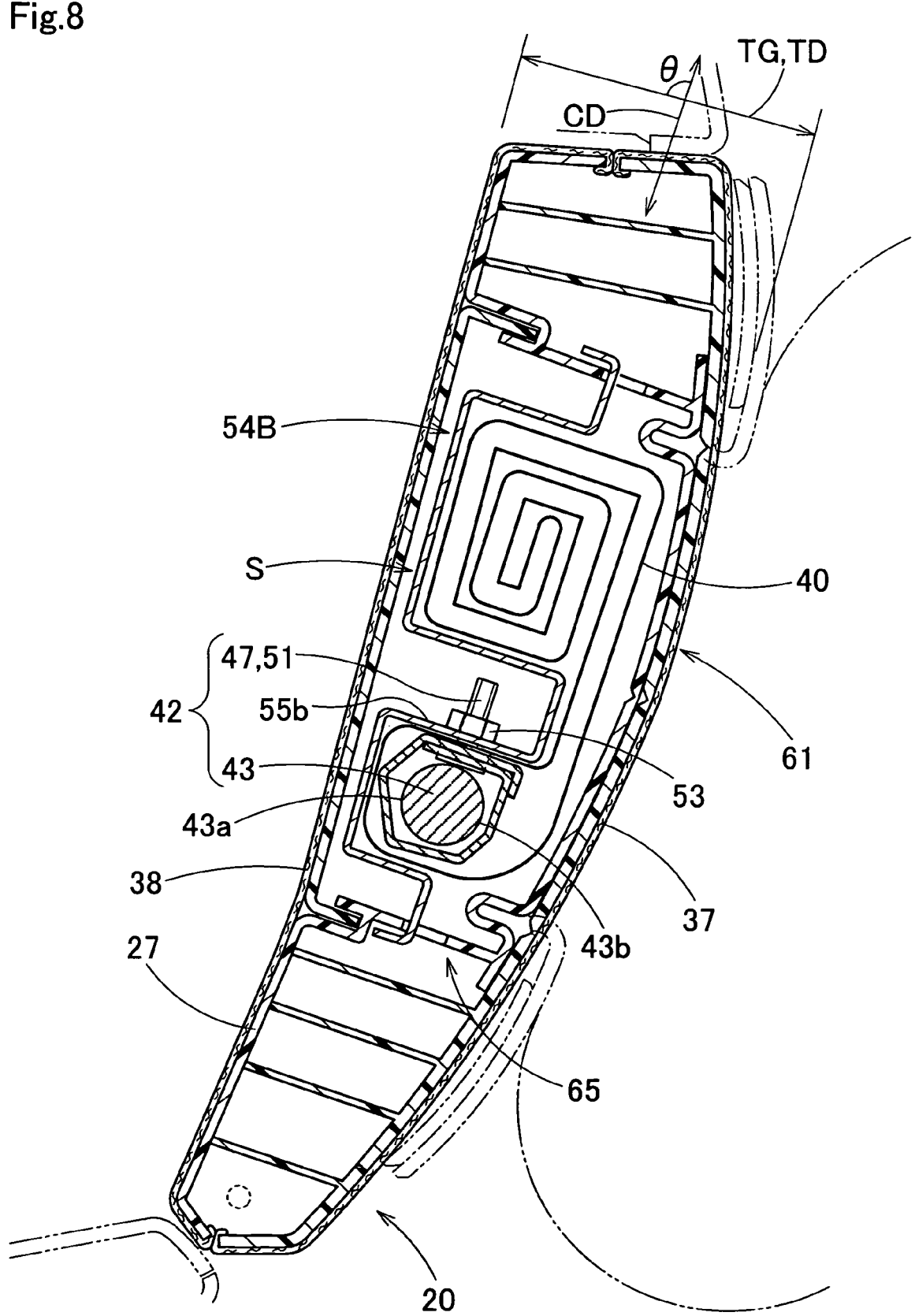
FIG. 8 is a schematic vertical section of a glove box door including still another embodiment of the knee-protecting airbag apparatus, as mounted on a vehicle.

It will further be appreciated that the mounting area 55b of the case 54 (54A, 54B) may be formed as shown in FIG. 7 or FIG. 8 such that the projecting direction CD of the bolt makes an angle θ of ±90° (95°, in the illustrated embodiment) to the thickness direction TD of the glove box door 20.

Although the bolts 51 of the foregoing embodiment are formed on the fixing section 47 provided separately from the inflator body 43, the bolts 51 may be formed on the outer circumference of the inflator body 43 to act as the fixing section itself. Further alternatively, the projecting portion 47a of the fixing section 47 of the inflator 42 may be comprised of such fixing means as rivets, instead of bolts 51.

Furthermore, although the glove box door 20 of the foregoing embodiments has been described as arranged diagonally such that the upper end 20a is located at the rear relative to the lower end 20b, the knee-protecting airbag apparatus of the present invention is also suitable for mounting on such a glove box door that is arranged vertically and has the thickness direction TD extending horizontally.

What is claimed is:

1. A knee-protecting airbag apparatus adapted to be mounted on a door of a glove box that has a box body provided with an opening at the rear and the door, the airbag apparatus comprising:

an airbag folded-up for deployment rearward from the glove box door;
a case housing the airbag and adapted to be secured to an interior of the glove box door, the case including at the rear with an opening for emergence of the airbag;
an inflator housed inside the airbag and feeding the airbag with inflation gas, the inflator including:
a generally columnar body extending in a left and right direction and provided with gas discharge ports; and
a fixing section that secures the body and the airbag to the case, the fixing section including a projecting portion that projects from the body to an outside of the airbag and is secured to the case, the projecting portion as secured to the case extending at an upward or downward angle to the thickness direction of the door of the glove box; and
an airbag cover constituting a rear face of the glove box door and covering the airbag emergence opening of the case in an openable manner at airbag deployment.

2. The knee-protecting airbag apparatus of claim 1 wherein the fixing section of the inflator is located at the rear relative to a front face of the case in the thickness direction of the glove box door.

3. The knee-protecting airbag apparatus of claim 1, wherein:
the inflator is located proximate the center in a vertical direction of the case; and
the airbag is housed in the case at the rear of the inflator such that an upper portion of the airbag is located above the inflator whereas a lower portion of the airbag is located below the inflator.

4. The knee-protecting airbag apparatus of claim 1, wherein:
the projecting portion of the fixing section of the inflator is comprised of a bolt that is nut-fastened to the case; and
the bolt is located proximate a front end of and proximate the center in a vertical direction of the case and extends at an angle surpassing 0° and not over 90° to a forward-oriented direction in the thickness direction of the door of the glove box.

5. The knee-protecting airbag apparatus of claim 4 wherein a leading end of the bolt is located at the rear relative to a front face of the case in the thickness direction of the glove box door.

6. The knee-protecting airbag apparatus of claim 4, wherein:
the projecting portion of the fixing section of the inflator is comprised of a plurality of the bolts arranged along a left and right direction;
the case includes on a front wall that is opposed to the emergence opening a first angle portion that protrudes toward the rear in a V-shape and extends in a left and right direction;
either the upper side or lower side of the angle portion acts as a mounting area to which the inflator and the airbag are secured by the bolts and nuts; and
a rear side of the mounting area acts as a space for housing the inflator.

7. The knee-protecting airbag apparatus of claim 6 wherein the front wall of the case includes on the opposite side of the first angle portion relative to the inflator a second angle portion that protrudes to the rear in a U-shape.

* * * * *